(12) United States Patent
Patacchini et al.

(10) Patent No.: US 10,119,374 B2
(45) Date of Patent: Nov. 6, 2018

(54) METHOD FOR SIMULATING FLUID FLOWS, A COMPUTER PROGRAM AND A COMPUTER READABLE MEDIUM

(71) Applicant: TOTAL SA, Courbevoie (FR)

(72) Inventors: Leonardo Patacchini, Pau (FR); Romain De Loubens, Pau (FR); Arthur Moncorge, Pau (FR)

(73) Assignee: TOTAL SA, Courbevoie (FR)

( * ) Notice: Subject to any disclaimer, the term of this patent is extended or adjusted under 35 U.S.C. 154(b) by 981 days.

(21) Appl. No.: 14/385,055

(22) PCT Filed: Mar. 11, 2013

(86) PCT No.: PCT/EP2013/054902
§ 371 (c)(1),
(2) Date: Sep. 12, 2014

(87) PCT Pub. No.: WO2013/135639
PCT Pub. Date: Sep. 19, 2013

(65) Prior Publication Data
US 2015/0073762 A1  Mar. 12, 2015

(30) Foreign Application Priority Data

Mar. 12, 2012  (EP) .................................. 12305289

(51) Int. Cl.
*G06G 7/48* (2006.01)
*E21B 43/16* (2006.01)
*G06F 17/50* (2006.01)

(52) U.S. Cl.
CPC .......... *E21B 43/16* (2013.01); *G06F 17/5009* (2013.01); *G06F 2217/16* (2013.01)

(58) Field of Classification Search
CPC ... E21B 43/16; G06F 17/5009; G06F 2217/16
(Continued)

(56) References Cited

U.S. PATENT DOCUMENTS 5,068,043 A * 11/1991 Thigpen ................. C09K 8/584
166/270.1
6,022,834 A *  2/2000 Hsu ........................ C09K 8/584
166/268

(Continued)

OTHER PUBLICATIONS

Technical Documentation for UTCHEM-9.0 ("A Three-Dimensional Chemical Flood Simulator", The University of Texas at Austin, 2000).*

(Continued)

*Primary Examiner* — Omar Fernandez Rivas
*Assistant Examiner* — Iftekhar Khan
(74) *Attorney, Agent, or Firm* — Patterson Thuente; Pedersen, P.A.

(57) ABSTRACT

A method for simulating fluid flows in a petroleum reservoir to improve final oil recovery. The fluid comprises water, hydrocarbon, and surfactant components. The method comprises a flash step for calculating compositions via two stages. A first stage comprises a first flash to determine first compositions of the water, oil and gas phases and is performed by omitting the surfactant component in the fluid. A second stage comprises a second flash to determine a microemulsion composition of the microemulsion phase.

14 Claims, 4 Drawing Sheets

(58) Field of Classification Search
USPC .......................................................... 703/10
See application file for complete search history.

(56) References Cited

U.S. PATENT DOCUMENTS

| | | | |
|---|---|---|---|
| 6,662,146 B1* | 12/2003 | Watts | E21B 49/00 703/10 |
| 7,689,397 B2* | 3/2010 | Ghorayeb | E21B 49/00 703/10 |
| 8,544,545 B2* | 10/2013 | Prentice, III | E21B 43/2406 166/272.3 |
| 9,068,448 B2* | 6/2015 | Hui | E21B 43/00 |
| 2004/0055208 A1* | 3/2004 | Chakrabarty | C10G 7/06 44/301 |
| 2005/0065759 A1* | 3/2005 | Barroux | E21B 4/04 703/10 |
| 2005/0165593 A1* | 7/2005 | Lenormand | E21B 49/00 703/10 |
| 2005/0256688 A1* | 11/2005 | Le Ravalec-Dupin | G01V 1/306 703/9 |
| 2008/0133193 A1* | 6/2008 | Gdanski | E21B 43/26 703/10 |
| 2009/0055141 A1* | 2/2009 | Moncorge | E21B 43/00 703/2 |
| 2010/0217574 A1* | 8/2010 | Usadi | E21B 43/12 703/10 |
| 2011/0226471 A1* | 9/2011 | Wattenbarger | C09K 8/58 166/263 |
| 2011/0246143 A1* | 10/2011 | Pomerantz | E21B 49/00 703/2 |
| 2011/0246164 A1 | 10/2011 | Gullapalli et al. | |

OTHER PUBLICATIONS

Kauerauf et al. (Using Flash Calculations to Determine Phase Compositions and Properties in Petroleum Systems Modeling, Bastionstrasse, 2001, pp. 1-14).*

Gerritsen et al. (Modeling Fluid Flow in Oil Reservoirs,2005, Annual Review Fluid Mechanics, 2005, pp. 211-238).*

Delshad et al. (A compositional simulator for modeling surfactant enhanced aquifer remediation, 1 Formulation, The University of Texas at Austin, 1995, pp. 303-327).*

Geiger et al. ("Mathematical analysis and numerical simulation of multi-phase multi-component flow in heterogeneous porous media", Elsevier Ltd., 2012, pp. 147-155).*

Chen et al, ("Analysis of a Compositional Model for Fluid Flow in Porous Media",, Society for Industrial and App lied Mathematics, 2000, pp. 747-777).*

PCT International Search Report for International Application No. PCT/EP2013/054902, dated Oct. 25, 2013, 2 pgs.

PCT Written Opinion for International Application No. PCT/EP2013/054902, dated Oct. 25, 2013, 5 pgs.

Patacchini, et al., "Four-Fluid-Phase, Fully Implicit Simulation of Surfactant Flooding", paper SPE 161630, © 2012 Society of Petroleum Engineers, 19 Pgs.

R.C. Nelson, et al., "Phase Relationships in Chemical Flooding", paper SPE 6773, © 1978 Society of Petroleum Engineers of AIME, 14 Pgs.

G.A. Pope, et al., "A Chemical Flooding Compositional Simulator", paper SPE 6725, © Society of Petroleum Engineers of AIME, 16 Pgs.

Lapene, et al., "Three-phase free-water flash calculations using a new Modified Rachford-Rice equation", Article in *Elsevier Fluid Phase Equilibria*, 297 (2010) 121-128, 8 Pgs.

Najafabadi, et al., "Development of a Three Phase, Fully Implicit, Parallel Chemical Flooding Simulator", paper SPE 119002, © 2009, Society of Petroleum Engineers, 20 Pgs.

Roshanfekr, et al., "Effect of Pressure, Temperature and Solution Gas on Oil Recovery From Surfactant Polymer Floods", paper SPE 125095, © 2009, Society of Petroleum Engineers, 15 Pgs.

Brantferger, et al., "Development of a Thermodynamically Consistent, Fully Implicit, Equation-of-State, Compositional Steamflood Simulator", paper SPE 21253, © 1991, Society of Petroleum Engineers, Inc., 10 Pgs.

H.L. Stone, "Probability Model for Estimating Three-Phase Relative Permeability", Article in *Journal of Petroleum Technology*, Feb. 1970, 214-218, 5 Pgs.

H.L. Stone, "Estimation of Three-Phase Relative Permeability and Residual Oil Data", Article in *Journal of Canadian Petroleum, Technology*, Oct.-Dec. 1973, Montreal, 53-61, 10 Pgs.

L.E. Baker, "Three-Phase Relative Permeability Correlations", paper SPE/DOE 17369, © 1988, Society of Petroleum Engineers, 539-554, 16 Pgs.

Yuan, et al., "A New Method to Model Relative Permeability in Compositional Simulators to Avoid Discontinuous Changes Caused by Phase Identification Problems", paper SPE 142093, © 2011, Society of Petroleum Engineers, 15 Pgs.

* cited by examiner

METHOD FOR SIMULATING FLUID FLOWS, A COMPUTER PROGRAM AND A COMPUTER READABLE MEDIUM

RELATED APPLICATIONS

The present application is a National Phase entry of PCT Application No. PCT/EP2013/054902, filed Mar. 11, 2013, which claims priority from EP Patent Application No. 12305289.6, filed Mar. 12, 2012, said Applications being hereby incorporated by reference in their entirety.

FIELD OF THE INVENTION

The present invention generally relates to a method for simulating fluid flows in a petroleum reservoir, such as for example occurring during depletion or flooding of said reservoir, and more specifically to a method for simulating surfactant flooding. The fluid is intended as a mixture of components that are either previously present inside said reservoir, or purposely injected.

BACKGROUND OF THE INVENTION

The present invention concerns more precisely a method implemented by a computer for simulating fluid flows in a liquid hydrocarbon (i.e. oil) bearing reservoir, in particular when undergoing surfactant flooding to improve the final oil recovery.

The method uses a model of said petroleum reservoir in which the fluid in place can split in a plurality of physical phases, specifically a gas phase, an oil phase, a water phase and a microemulsion phase. In turn, each physical phase can comprise a plurality of components, the component list comprising at least water, a hydrocarbon, and a surfactant component. Often, a polymer component and a salt component are considered as well.

Determining the composition of a physical phase is determining at least a concentration and a quantity of each component in said physical phase.

The method usually includes a flash step for calculating the equilibrium of all the component compositions in each physical phase resulting from the phase split of a given feed. The flash step is used in particular to introduce a new phase in the reservoir model where and when needed during the simulation. The method also includes the construction of thermodynamic equilibrium constraints to be coupled to the flow (or transport) equations, to ensure that all the physical phases introduced in the simulation by the flash step remain in equilibrium at all time steps during the simulation.

The document US 2011/246164 discloses such a method for surfactant flooding simulation, that has the advantage of determining the relative permeability of the physical phases in such a way as to maintain physical continuity when and where the phase-state changes. The model takes into account a water phase, an oil phase, and a microemulsion phase, and transport is treated fully implicitly.

However, such method can take into account neither a gas phase, nor a plurality of hydrocarbon components inside the oil and microemulsion phases.

OBJECTS AND SUMMARY OF THE INVENTION

One object of the present invention is to provide an improved method for simulating fluid flows in a petroleum reservoir, in particular when surfactant injection is considered to improve the recovery.

To this effect, the flash step of the method for simulating fluid flows in a petroleum reservoir comprises the following stages:
- a first stage comprising at least a first flash to determine compositions of a group of phases, said group of phases being the water phase, the oil phase and the gas phase, and said first flash being performed by omitting the surfactant component in the fluid,
- a second stage wherein, in case the water phase and the oil phase are simultaneously present in the group of phases determined at the first stage, said second stage comprises at least a second flash to determine a microemulsion composition of the microemulsion phase.

Thanks to these features, the method is capable of processing a petroleum reservoir simulation with four physical phases (water phase, oil phase, gas phase and microemulsion phase) holding a plurality of components (hydrocarbons, water, surfactant, polymer, anions, . . . ).

The method is capable of processing surfactant flooding in the presence of a gas phase.

In various embodiments of the method, one and/or other of the following features may optionally be incorporated.

According to an aspect of the invention, the second stage comprises the following sub-steps:
- lumping the gas phase, the water phase and oil phase into pseudo-phases, the pseudo-phases comprising an oleic pseudo-phase, an aqueous pseudo-phase and a chemical pseudo-phase,
- performing the second flash on the bases of the pseudo-phases to determine updated compositions of the water phase, oil phase, and to determine the microemulsion composition of the microemulsion phase.

According to an aspect of the invention, the second flash is performed by omitting the gas phase in the group of phases determined at the first stage the second stage comprises the following sub-steps:
- lumping the water phase and oil phase into pseudo-phases, the pseudo-phases comprising an oleic pseudo-phase, an aqueous pseudo-phase and a chemical pseudo-phase,
- performing the second flash on the bases of the pseudo-phases to determine updated compositions of the water phase, oil phase, and to determine the microemulsion composition of the microemulsion phase.

According to an aspect of the invention, the second stage comprises a final sub-step wherein the gas phase determined at the first stage is merged with the water phase, oil phase and microemulsion phase determined during the second stage.

According to an aspect of the invention, the lumping sub-step comprises:
- a first lumping operation wherein a first fraction of the surfactant component is lumped into the aqueous pseudo-phase so as for the surfactant concentration in said aqueous pseudo-phase to be below the critical micelle concentration, and
- a second lumping operation wherein a second fraction of the surfactant component, said second fraction remaining after the first lumping operation, is lumped into the chemical pseudo-phase.

According to an aspect of the invention, the method further processes the following steps after the flash step:
- a building step that builds reservoir equations based on the compositions of the physical phases determined by the flash step, a solving step that solves the reservoir equations to determine reservoir variables at the end of the time step.

According to an aspect of the invention, the solving step is performed with a fully implicit solving method or with an adaptive implicit solving method.

According to an aspect of the invention, the method further processes after the solving step, a storing step for storing the reservoir variables onto a medium.

According to an aspect of the invention, the reservoir equations comprise:
- molar balance equations for each component in the fluid, and
- thermodynamic constraint equations corresponding to an equilibrium of all the physical phases that are present in the fluid.

According to an aspect of the invention, the molar balance equations write for each component of the fluid:

$$\frac{\partial}{\partial t}\left(\phi \sum_{j=1}^{n_p} S_j \rho_j c_{i,j}\right) + \nabla \cdot \left(\sum_{j=1}^{n_p} \underline{u}_j \rho_j c_{i,j}\right) = 0$$

where
- i is an index corresponding to a component in the fluid,
- j is an index corresponding to a phase,
- $c_{i,j}$ is the molar fraction of component i in phase j,
- $S_j$ is the saturation of phase j,
- $\phi$ is the rock porosity,
- $\rho_j$ is the molar density of phase j,
- $n_p$ is the maximum number of phases present in the fluid,
- $\underline{\nabla}$ is the nabla operator,
- $\underline{u}_j$ is the Darcy velocity that writes:

$$\underline{u}_j = -\underline{\underline{k}}\frac{k_{rj}}{\mu_j}(\nabla P_j - \overline{\rho}_j g)$$

where
- $P_j$ is the pressure of phase j,
- $\underline{\underline{k}}$ is the absolute permeability tensor of the petroleum reservoir,
- $k_{rj}$ is the relative permeability of the phase j,
- $\mu_j$ is the viscosity of the phase j
- $\underline{g}$ is the gravity acceleration,
- $\overline{\rho}_j$ is the mass density of phase j.

According to an aspect of the invention, the thermodynamic constraint equations comprise oil-microemulsion thermodynamic constraints equations that write:

$$\forall i \in [1:n_c]: \Gamma_{om}(o_i - x_i) + \kappa_o = 0$$

where
- $n_c$ is the number of components in the fluid,
- $o_i$ is the molar fraction of component i in the oleic pseudo-phase constitutive of the microemulsion phase,
- $x_i$ is the molar fraction of component i in the oil phase,
- $\kappa_o$ is a volumetric microemulsion constraint,
- $\Gamma_{om}$ is the molar fraction of oleic pseudo-phase in the microemulsion phase.

According to an aspect of the invention, the thermodynamic constraint equations comprise water-microemulsion thermodynamic constraints equations that write:

$$\forall i \in [1:n_c]: \Gamma_{am}(a_i - w_i) + \kappa_a = 0$$

where
- $n_c$ is the number of components in the fluid,
- $a_i$ is the molar fraction of component i in the aqueous pseudo-phase constitutive of the microemulsion phase,
- $w_i$ is the molar fraction of component i in the water phase,
- $\kappa_a$ is a volumetric microemulsion constraint, and
- $\Gamma_{am}$ is the molar fraction of aqueous pseudo-phase in the microemulsion phase.

The usual gas-oil and gas-water or oil-water equilibrium constraints, typical for simulating fluid flows in a petroleum reservoir without surfactant, are completed for example by the above oil-microemulsion and water-microemulsion equilibrium constraints.

Thanks to some of the above aspects of the method, the method further ensures that the plurality of hydrocarbon components is in equilibrium across all said physical phases, and allows the transport to be treated fully implicitly.

The invention also relates to a computer program comprising program code instructions for processing the above method steps, the computer program being run by a computer.

The invention also relates to a computer readable medium having a computer program recorded on it, said computer program comprising program code instructions for processing the above method steps.

BRIEF DESCRIPTION OF THE DRAWINGS

Other features and advantages of the invention will be apparent from the following detailed description of one of its embodiments given by way of non-limiting example, with reference to the accompanying drawings. In the drawings.

MORE DETAILED DESCRIPTION

Figure 1:
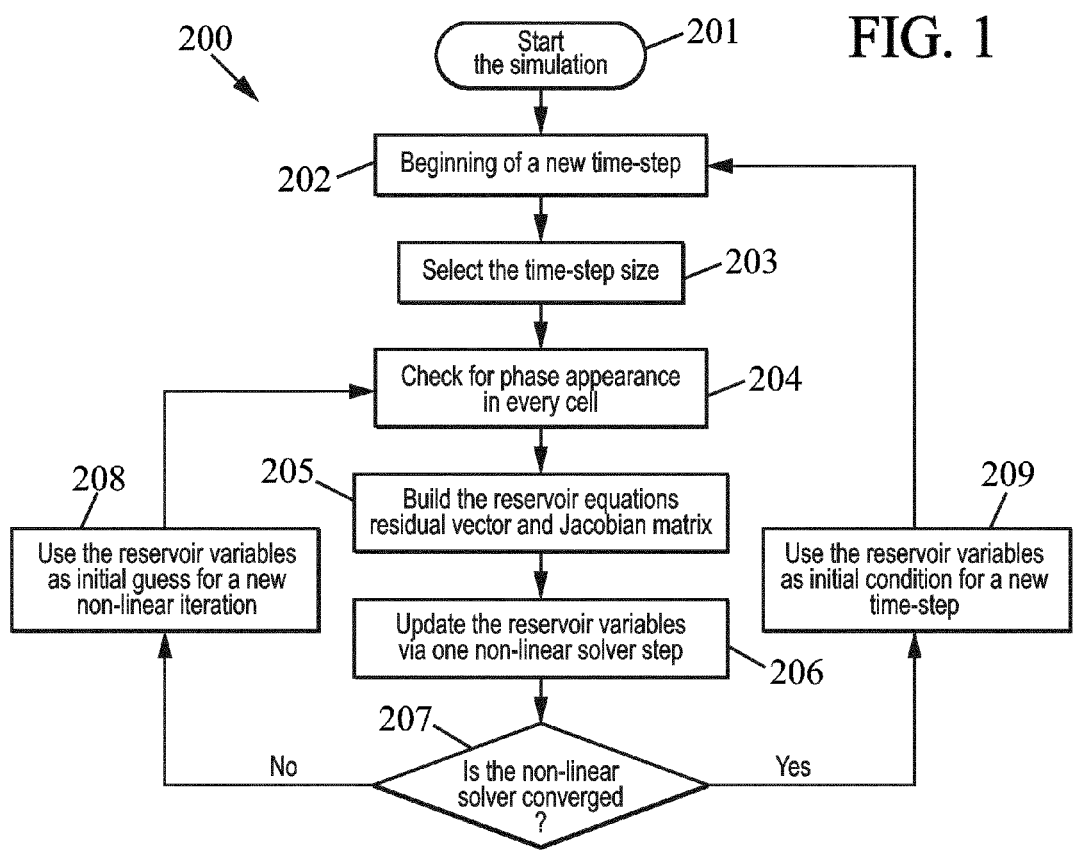
FIG. 1 is a flow chart showing the steps of a method for simulating fluid flows in a petroleum reservoir.

The invention will be described in the following detailed description with the known knowledge of the following reference documents that are incorporated into the present detailed description by reference, and that a skilled man can use to implement the present invention.

The reference documents are:
Reference 1: "Phase Relationships in Chemical Flooding", R. C. Nelson and G. A. Pope, SPE 6773, 1978;
Reference 2: "A chemical Flooding Compositional Simulator", G. A. Pope and R. C. Nelson, SPE 6725, 1978;
Reference 3: "Eclipse reservoir simulation software Technical description", Schlumberger, 2010;
Reference 4: "Reveal version 4.0 User Manual", Petroleum Experts, 2009;

Reference 5: "Stars-ME User's Guide", Computer Modelling Group, 2010;

Reference 6: "Thermodynamic models: Fundamentals and Computational Aspects", Tie-Line Publications, $2^{nd}$ Edition, 2007;

Reference 7: "UTCHEM-9.0, Technical documentation", UT-Austin (2000).

The present invention concerns a method implemented by a computer for simulating fluid flows in a petroleum reservoir, in particular when surfactant injection is considered to improve the recovery.

The reservoir is a subterranean volume that is filled with a fluid comprising at least a hydrocarbon component that is intended to be extracted. It is in practice difficult to extract all the hydrocarbons contained inside a reservoir, and the production typically comprises at least three successive production periods.

During a first production period, the original reservoir pressure is sufficient to push hydrocarbons out of the producer wells. Typically, this first production period permits to recover approximately only 10% of the original hydrocarbons (e.g. contained in an oil physical phase) in place inside the reservoir.

During a second production period, called water flooding, pressurized water is injected from injector wells to sweep part of the remaining hydrocarbons, later recovered from producer wells. This second production period usually permits to recovers approximately 30 to 40% of the original hydrocarbons (e.g. contained in an oil physical phase) in place.

There are still left-over hydrocarbons after the two first production periods, due to unswept areas as well as to the presence of residual hydrocarbons in the pores. When this second effect is dominant, a third production period called surfactant flooding can be considered, where a quantity of surfactant component is added to the injection water to reduce the interfacial tension between the water and the remaining hydrocarbons (e.g. contained in an oil physical phase), improving the mobility of hydrocarbons inside the reservoir. Thanks to such technique, up to an additional 30% of the original hydrocarbons in place can be recovered.

Variants of this third production period include Surfactant-Polymer flooding, and Alkali-Surfactant-Polymer flooding.

Surfactant and polymer components are expensive, and might either degrade or be adsorbed inside the reservoir. The surfactant flooding procedure can be predetermined and optimized numerically by computer simulation before being applied to the real reservoir so as to use less surfactant and components and/or to extract more hydrocarbons from the reservoir. The simulation tool used for such purpose uses a reservoir model defining the subterranean volume that comprises information about the geometry of the reservoir, the nature and characteristics of the rocks (porosity and permeability), and of the fluids that are present inside said reservoir.

The fluid in the reservoir is a mixture of a plurality of components. For example, the plurality of components may comprise at least two components among the following list: a hydrocarbon, a water, a surfactant, a polymer, an anion, an alkali, a co-surfactant, a salt, an alcohol, and any other known component. It may also comprise a plurality of any one of them.

The components of the fluid can split in a plurality of physical phases, among which a gas phase, an oil phase, a water phase, and a microemulsion phase.

The characteristics of a physical phase (such as its density or viscosity) are governed by the pressure, the temperature, as well as its composition, i.e. at least the concentration and quantity of each component in said physical phase. For example, an oil phase may comprise a concentration of 3% of methane, 10% of CO2, 15% of benzene, etc. . . . The quantities of each component may be expressed in any known quantity unit of measurement, for example in a molar amount.

Therefore, determining a physical phase is determining said composition (concentrations and quantities of the components).

The reservoir model also defines the subterranean volume that is divided into a grid or a mesh comprising a plurality of cells. To each cell is associated a rock porosity and permeability, as well as fluid properties such as pressure, temperature, phase saturations and phase compositions.

The water phase and the oil phase are usually not miscible. However, when the concentration of a surfactant component inside the water phase goes above a Critical Micelle Concentration (CMC), the water and oil phases become at least partially mutually soluble in a proportion that can be determined at least by the water salinity $C_S$. Consequently to this miscibility, a microemulsion phase can form in the fluid, and some quantities of each component of the fluid can migrate inside said microemulsion phase. Thanks to the typically low interfacial tension between the microemulsion phase and the oil phase, as well as between the microemulsion phase and the water phase, additional oil phase can be recovered during the third production period (surfactant flooding).

Accounting for the dynamic microemulsion phase behaviour is therefore very important in the simulation of surfactant flooding to obtain accurate simulation results, in order to optimize the process of surfactant flooding (at least the injected quantities of water and surfactant over time, the injection salinity and the injection rate as well as timing).

The method for simulating a petroleum reservoir comprises the following operations:
  providing a reservoir model,
  performing a simulation of the model under predefined initial conditions during a time range to provide results.

The results from the simulation are stored on a medium, and can be displayed on a screen or printed on a printer. The medium may be a memory, a hard drive, a solid state hard drive, or any known media.

The results may comprise at least the pressure, phase saturations and concentration of each component in each phase, for each cell of the model, at each time-step. The results may also comprise global information on the model, such as the percentage of hydrocarbon components recovered, the quantity of injected water, or any information that can be calculated via the output data from the simulation.

The simulation 200 is performed according to a well known flow chart as illustrated on FIG. 1. The simulation method of a petroleum reservoir comprises the following steps:
  beginning a new time step 202;
  selecting a time step size 203;
  checking for a phase appearance 204 in every cell through a stability (or, in the absence of stability routine, through a flash) calculation, and in case a new phase appears in a given cell, a flash 300 is performed to introduce the phase in said cell;
  building reservoir equations 205;
  solving the reservoir equations 206 to provide updated reservoir variables;

determining if the previous solving step has converged;
in case the solving step 206 has converged, the simulation method continues to an updating step 209 wherein the updated reservoir variables are stored and ready for use for a new time step (next time step), and the simulation method returns to the step of beginning a new time step 202;
in case the solving step 206 has not converged, the simulation method continues to a looping step 208 wherein the updated reservoir variables are kept as an improved initial guess, and the simulation method returns to the step 204 of performing a new iteration to solve the reservoir model.

The reservoir variables are for example the pressure, temperature, phase saturations and phase compositions.

A flash 300 is a calculation that determines the composition of each physical phase present at equilibrium from a given feed. The flash determines the quantity as well as the concentration of each component in all the physical phases (gas phase, water phase, oil phase, microemulsion phase). It is used in step 204, after checking for phase appearance in every cell, to introduce the appearing phases where needed.

The step of building the reservoir equations 205 is essentially a mass (or molar) balance for each component, as well as an energy balance in case we wish to perform a thermal run (this is typically not required in surfactant flooding), as well as an enforcement of thermodynamic constraints imposing equilibrium of each component across each physical phase. During this step, the current error defines a residual vector, and the equations may be linearized to obtain a Jacobian matrix.

The step of solving the reservoir equations 206 may be a Newton-Raphson method, in which a linear solver is used to invert the Jacobian matrix.

According to the present invention, the flash step is adapted to simulate a four phase fluid (i.e. comprising gas phase, oil phase, water phase and microemulsion phase), the building of thermodynamic constraints is adapted to simulate a four phase fluid, and the simulation can be performed fully implicitly.

Figure 2:
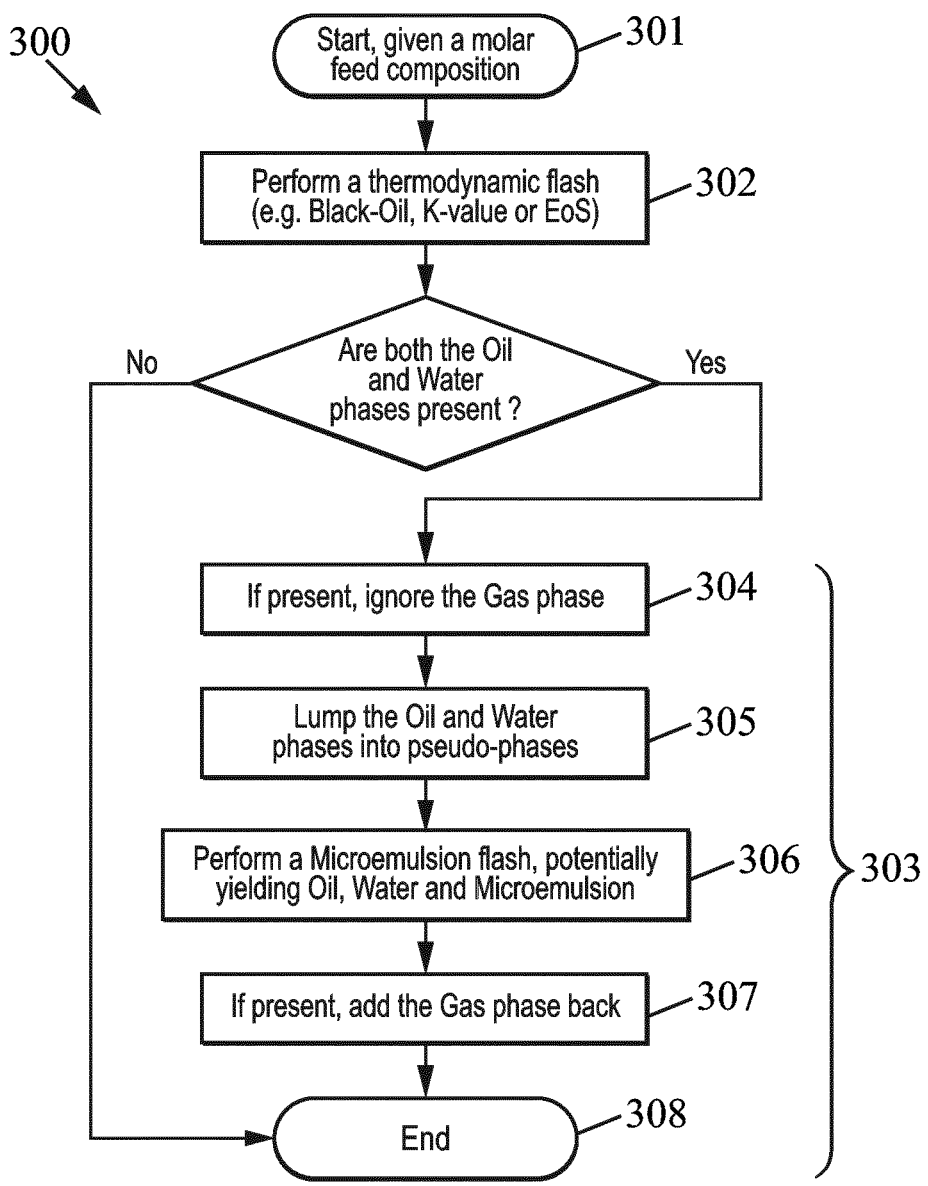
FIG. 2 is a flow chart showing the detailed sub-steps of a flash step according to the invention, said flash step being for example implemented into the step 204 of the method of FIG. 1.

The flash step 300 used during the simulation method is illustrated on FIG. 2, and comprises an initial step 301 wherein the components quantities and the components concentrations in the feed are given (molar feed composition), and comprises the following two stages:
performing a first stage 302 comprising at least a first flash to determine the compositions of the water phase, the oil phase and the gas phase (i.e. the concentrations and the quantities of the components in each physical phase), said water phase, oil phase and gas phase being a group of phases, and said first flash being performed by omitting the surfactant component in the fluid,
performing a second stage 303 wherein, in case the water phase and the oil phase are simultaneously present in the group of phases of the model (that are determined during the first stage, where the surfactant is omitted), said second stage comprising at least a second flash 306 to determine a microemulsion composition of a microemulsion phase consisting of the mutually soluble fraction of said water and oil phases.

According to an embodiment of the invention, the second flash 306 is performed by omitting the gas phase in the group of phases determined at the first stage.

In that case, the gas phase determined at the first stage is merged to all the other physical phases at the end of the second stage 303 (in sub-step 307).

According to another embodiment of the invention, the second flash 306 is performed without ignoring the gas phase determined at the first stage.

In that case, the gas phase is lumped into the pseudo-phases for performing the second flash 306, as it will be explained later.

A physical phase is considered to be present in the fluid, if a total quantity of the components that are present in said phase is not zero or not near zero, i.e. above a predetermined quantity value (a small quantity).

During the first stage 302, the first flash can implement for example a Black-Oil model, a K-Value model, or an Equation of State model (EoS).

If after the first stage, the first flash result shows that the oil phase and the water phase do not exist simultaneously, there is no need to investigate whether a microemulsion phase needs to be introduced, and the flash step ends directly at step 308.

If after the first stage, the first flash result shows that the oil phase and the water phase exist simultaneously, the flash step is continued via a second stage 303 comprising the following sub-steps:
ignoring 304 the gas phase concentrations determined at the first stage 302, if the gas phase is present,
lumping 305 the water phase and the oil phase into pseudo-phases, the pseudo-phases comprising an oleic pseudo-phase, an aqueous pseudo-phase and a chemical pseudo-phase,
performing a second flash 306 on the bases of the pseudo-phases volumetric amount to determine the oil phase, water phase, and microemulsion phase volumetric amount, molar amount and molar compositions, and
adding 307 back the gas phase, if the gas phase was found at the end of the first stage 302.

Then, the flash step ends at step 308.

According to another embodiment of the invention, the gas phase is not ignored at step 304 if present, and the gas phase is associated to the oil phase before the lumping step 305. In this case, there is no need for the step 307. Some explanations of the way of implementing such association of the gas phase and the oil phase can be found in the document reference 4. However, none of the prior art simulation methods enable fully implicit simulation with a gas phase. Indeed, the methods of the cited reference documents are implemented for example in the Reveal (document reference 4) or UTCHEM (document reference 7) softwares. These methods may treat a gas phase, but only the pressure variable is treated implicitly (i.e. the solution method is not fully implicit). The Stars-ME software (document reference 5) may treat the reservoir equations fully implicitly, but cannot treat a gas phase.

Thanks to the fully implicit method of the present invention, the stability of the simulation method is improved, and the time steps may be larger than in the prior art methods.

The simulation method of present invention may be incorporated in existing fully implicit reservoir simulation software.

Therefore, thanks to the present invention method, simulation of fluid flows in a petroleum reservoir can be performed before and after the start of chemical injection (injection of surfactant component), using the same tool, without breaking continuity of the physics.

1—First Stage 302 (First Flash)

The first stage 302 comprises a first flash (thermodynamic flash) performed by omitting the surfactant component in the fluid feed. At this stage, the fluid might split in only three phases, i.e. a gas phase, an oil phase and a water phase, the microemulsion phase not being yet considered. The first flash is performed according to prior art equilibrium models, and a description of the solution algorithms can be found for example in the reference document 6.

A first variant of the equilibrium model is defined by the Equation of State (EoS) model. In that case, the thermodynamic constraints between the oil and gas phases write:

$$\forall i \in [1:n_h]: x_i \varphi_i^x - y_i \varphi_i^y = 0$$

where
- $(x_i, y_i)$ are normalized molar compositions of the oil and gas phases, respectively,
- $(\varphi_i^x, \varphi_i^y)$ are fugacity coefficients of component i the oil and gas phases, respectively,
- i is an index representing a fluid component among all the fluid components, said component partitioning between the oil and gas phases.

The fugacity coefficients $(\varphi_i^x, \varphi_i^y)$ depend on or are functions of pressure P, temperature T and phase compositions $\underline{x}$ and $\underline{y}$.

More detailed descriptions of the EoS flash algorithm may be found in the document reference 6.

A second variant of the equilibrium model is defined by the K-value model. In that case, the thermodynamic constraints between the oil and gas phases write:

$$\forall i \in [1:n_h]: K_i x_i - y_i = 0$$

where
- $K_i$ are the K-values, and
- $(x_i, y_i)$ are normalized molar compositions of the oil and gas phases, respectively.

The K-values $K_i$ are functions of pressure P and temperature T. The K-values can be given in the form of tables or correlations. More detailed information may be found in the documents reference 3 and reference 5.

A third variant of the equilibrium model is defined by the Black-Oil model, wherein one light hydrocarbon component and one heavy hydrocarbon component are considered. In that case, the thermodynamic constraints between the oil and gas phases can be cast in K-value form, said K values writing:

$$K_l = \frac{1}{R_s^{sat}} \frac{\theta + R_s^{sat}}{1 + \theta \cdot R_v^{sat}}$$

$$K_h = R_v^{sat} \frac{\theta + R_s^{sat}}{1 + \theta \cdot R_v^{sat}}$$

where
- $K_l$ is the K-value for the light hydrocarbon,
- $K_h$ is the K-value for the heavy hydrocarbon,
- $\theta$ is a ratio of gas phase and oil phase molar volumes at standard conditions,
- $R_s^{sat}$, and $R_v^{sat}$ are gas phase solubilisation ratio and oil phase vaporisation ratio, respectively. These ratios are typically functions of pressure P only, and can be given as tables (see document reference 3).

The flash algorithm can be based on the shortly disclosed above models, or any other model representing the equilibrium of two or more fluid phases.

2—Second Stage 303

2.1—Lumping Step 305

Three pseudo-phases may be considered: an oleic pseudo-phase, an aqueous pseudo-phase, and a chemical pseudo-phase.

A first sub-step of the lumping step 305 is to lump the totality of the oil phase into the oleic pseudo-phase.

A second sub-step of the lumping step (305) is to lump the water phase, according to the following.

The micelle concentration in the water phase is defined by:

$$C_M = \frac{w_s}{w_w}$$

where
- $w_s$ is the surfactant component concentration inside the water phase,
- $w_w$ is the water component concentration inside the water phase.

According to a variant, the micelle concentration is defined by $C_M = w_s$, which gives in practice good results as the water component is dominant inside the water phase.

Then:
- if $C_M <$ CMC, the totality of the water phase is lumped into the aqueous pseudo-phase, and no chemical pseudo-phase is considered, and
- if $C_M \geq$ CMC, the excess surfactant is lumped into the chemical pseudo-phase.

2.2—Second Flash 306

The second flash 306 of the method is a microemulsion equilibration processed on the pseudo-phases determined at the above lumping step 305.

Figure 3:
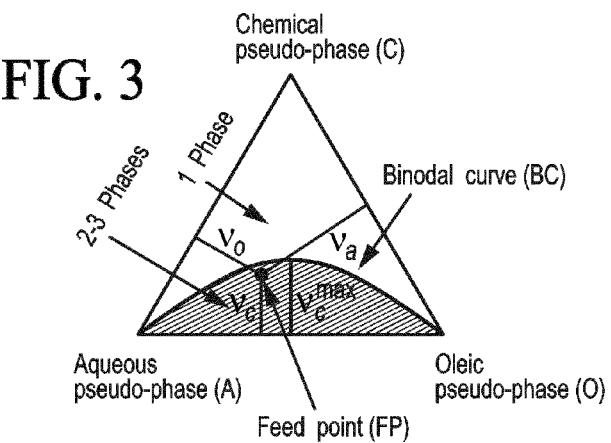
FIG. 3 is a ternary diagram used for modelling and processing the second flash step 306 of FIG. 2, said diagram illustrating the equilibrium of pseudo-phases potentially yielding a microemulsion phase.

This equilibration can be processed for example by a model that is a simplification of the volumetric Hand's rule model disclosed in document reference 2. The model uses a volumetric ternary diagram as presented on FIG. 3.

Figure 3A:
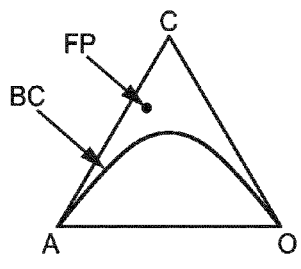
FIGS. 3a to 3f correspond to the six possible configurations of the equilibrium of the pseudo-phases.
Figure 3B:
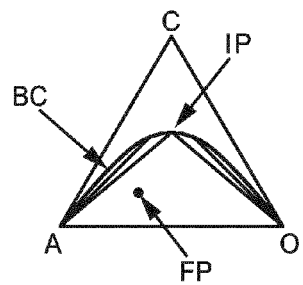
Figure 3C:
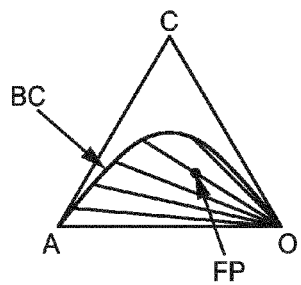
Figure 3D:
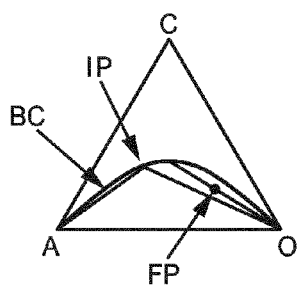
Figure 3E:
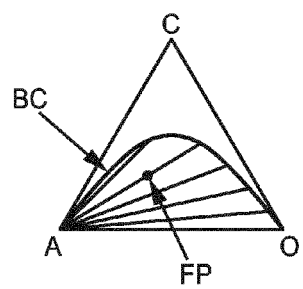
Figure 3F:
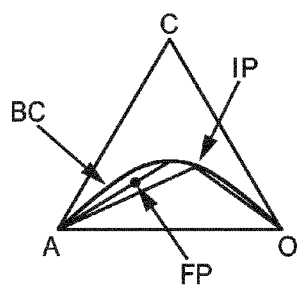

The skilled man may also refer, for example, to the document reference 1 for a detailed description of the ternary diagram, as well as the six possible configurations (reproduced on FIGS. 3a to 3f) that need to be considered according the position of the feed (The feed point FP being represented by the dot on these figures): above the binodal curve (FIG. 3a), the Winsor III regime (FIG. 3b), the Winsor II− regime (FIG. 3c), the Winsor III regime in the II− lobe (FIG. 3d), the Winsor II+ regime (FIG. 3e), the Winsor III regime in the II+ lobe (FIG. 3f).

As a simplification, it is assumed that the binodal curve (BC) is symmetric and that the excess phases are pure in any phase environment. Plait points therefore need not to be considered.

Points located on the symmetric binodal curve then satisfy the following equation:

$$v_c^2 = A v_o v_a$$

where
- $v_o, v_a, v_c$ are the normalized volumetric compositions of the pseudo-phases (oleic, aqueous and chemical that also referenced as O, A and C on the figures), said composition following the conservation relation $v_o + v_a + v_c = 1$, and A can be obtained from the binodal height $v_c^{max}$ via:

$$A = \left(\frac{2 v_c^{max}}{1 - v_c^{max}}\right)^2.$$

Said binodal parameter A is assumed to vary linearly in salinity $C_S$, according to the following law:

$$A = \begin{cases} A_0 + (A_1 - A_0)\dfrac{C_S}{C_{SOP}} & \text{if } C_S \leq C_{SOP} \\ A_1 + (A_2 - A_1)\left(\dfrac{C_S}{C_{SOP}} - 1\right) & \text{if } C_S \geq C_{SOP} \end{cases}$$

where
- $A_0, A_1, A_2$ are input model parameters,
- $C_S$ is the salinity that is defined as a ratio of the anion concentration to the water concentration,
- $C_{SOP}$ is the optimal salinity (input model parameter),
- $C_{SL}$ is a lower salinity bound (input model parameter),
- $C_{SU}$ is an upper salinity bound (input model parameter).

We define:

$$\alpha = \frac{1}{2} + \frac{v_o - v_a}{2},$$

position of the feed FP projected on the oleic-aqueous axis, and we assume that the position of the invariant point IP (shown on FIGS. 3b, 3d and 3f) projected on the oleic-aqueous axis, given by $$\alpha^{inv} = \frac{1}{2} + \frac{v_o^{inv} - v_a^{inv}}{2},$$

moves across the diagram linearly in salinity from $C_{SL}$ to $C_{SOP}$, and from $C_{SOP}$ to $C_{SU}$, i.e.

$$\begin{cases} \alpha^{inv} = \dfrac{1}{2}\dfrac{C_S - C_{SL}}{C_{SOP} - C_{SL}} & \text{if } C_{SL} \leq C_S \leq C_{SOP} \\ \alpha^{inv} = \dfrac{1}{2} + \dfrac{1}{2}\dfrac{C_S - C_{SOP}}{C_{SU} - C_{SOP}} & \text{if } C_{SOP} \leq C_S \leq C_{SU} \end{cases}$$

We consider further that $v_{cj}^{max}$, as well as $C_{SL}$, $C_{SOP}$ and $C_{SU}$, depend on pressure P, temperature T, and on the oleic pseudo-phase composition "$o_i$" through the Equivalent Alkane Carbon Number (EACN):

$$EACN = \frac{\sum_{i=1}^{n_h} o_i ACN_i}{\sum_{i=1}^{n_h} o_i},$$

as well as through any other parameter deemed relevant.

According to a variant of the invention, several salt species are present (e.g. for the purpose of distinguishing monovalent and divalent cations). It is then important to replace the salinity $C_S$ by a an effective salinity $C_{SE}$.

The second flash 306 step is for example performed as disclosed in the document reference 2. It comprises a first sub-step to determine volumetric compositions of the phases, and a second sub-step to determine the normalized volumes of the phases (oil phase, water phase and microemulsion phase).

The first sub-step of the second flash 306 is to determine the equilibrium volumetric composition of the oil phase, the water phase and the microemulsion phase.

We consider that $\underline{\check{x}}, \underline{\check{w}}, \underline{\check{m}}$ are the normalized volumetric compositions of oil phase, water phase and microemulsion phase in term of pseudo-phases.

In the present case (pure excess-phases), we have:

$$\underline{\check{x}} = \begin{bmatrix} 1 \\ 0 \\ 0 \end{bmatrix}, \underline{\check{w}} = \begin{bmatrix} 0 \\ 1 \\ 0 \end{bmatrix},$$

and $\underline{\check{m}}$ is determined according the position of the feed in the Winsor diagram:

if the feed is above the binodal (FIG. 3a):

$$\underline{\check{m}} = \begin{bmatrix} v_o \\ v_a \\ v_c \end{bmatrix}$$

if the feed is inside the Winsor III triangle (FIG. 3b):

$$\underline{\check{m}} = \begin{bmatrix} v_o^{inv} \\ v_a^{inv} \\ v_c^{inv} \end{bmatrix}$$

if the feed is in the Winsor II⁻ regime inside the binodal (FIG. 3c), or in the Winsor III regime inside the II⁻ lobe (FIG. 3d):

$$\underline{\check{m}} = \frac{1}{R_{ca}^2 + A + AR_{ca}} \begin{bmatrix} R_{ca}^2 \\ A \\ AR_{ca} \end{bmatrix}, R_{ca} = \frac{\check{m}_c}{\check{m}_a}$$

being a solubilisation ratio that is equal to $v_c/v_a$ since the oleic excess pseudo-phase is pure.

if the feed is in the Winsor II⁺ regime inside the binodal (FIG. 3e), or in the Winsor III regime inside the II⁺ lobe (FIG. 3f):

$$\underline{\check{m}} = \frac{1}{A + R_{co}^2 + AR_{co}} \begin{bmatrix} A \\ R_{co}^2 \\ AR_{co} \end{bmatrix}, R_{co} = \frac{\check{m}_c}{\check{m}_o}$$

being a solubilisation ratio that is equal to $v_c/v_o$ since the aqueous excess pseudo-phase is pure.

The second sub-step of the second flash 306 is to determine the equilibrium volumes of those phases by a volumetric balance. This can be expressed for example by solving the following equations:

$$\begin{bmatrix} \check{x}_o - \check{m}_o & \check{w}_o - \check{m}_o & 0 \\ \check{x}_o - \check{m}_o & \check{w}_a - \check{m}_a & 0 \\ 1 & 1 & 1 \end{bmatrix} \cdot \begin{bmatrix} v_x \\ v_w \\ v_m \end{bmatrix} = \begin{bmatrix} v_o - \check{m}_o \\ v_a - \check{m}_a \\ 1 \end{bmatrix}$$

where $v_x, v_w, v_m$ are the normalized volumetric fractions of each phase (oil phase, water phase and microemulsion phase).

The number of moles for each phase can then be calculated from their respective density.

3—Petroleum Reservoir Equations for Step 205

The reservoir equations that are built at step 205 and that are solved at step 206 of the simulation method comprise molar balance equations for each component of the fluid. These equations can be for example written as:

$$\frac{\partial}{\partial t}\left(\phi \sum_{j=1}^{n_p} S_j \rho_j c_{i,j}\right) + \nabla \cdot \left(\sum_{j=1}^{n_p} \underline{u}_j \rho_j c_{i,j}\right) = 0$$

where
- $i$ is an index corresponding to a component in the fluid,
- $j$ is an index corresponding to a phase,
- $c_{i,j}$ is the molar fraction of component i in phase j,
- $S_j$ is the saturation of phase j,
- $\phi$ is the rock porosity,
- $\rho_j$ is the molar density of phase j,
- $n_p$ is the number of phases in the fluid,
- $\underline{\nabla}$ is the nabla operator,
- $\underline{u}_j$ is the Darcy velocity that writes:

$$\underline{u}_j = -\underline{\underline{k}} \frac{k_{rj}}{\mu_j} (\nabla P_j - \bar{\rho}_j \underline{g})$$

where
- $P_j$ is the pressure of phase j,
- $\underline{\underline{k}}$ is the absolute permeability tensor of the petroleum reservoir,
- $k_{rj}$ is the relative permeability of the phase j,
- $\mu_j$ is the viscosity of the phase j
- $\underline{g}$ is the gravity acceleration,
- $\bar{\rho}_j$ is the mass density of phase j.

The reservoir equations also comprise in the natural variables formulation the following equations:

a saturation constraint that may be written as:

$$\sum_{j=1}^{n_p} S_j = 1$$

composition constraints that may be written as:

$$\forall j, \sum_{i=1}^{n_c} c_{i,j} = 1$$

capillary pressure constraints relating each individual phase pressure $P_j$ to a reference pressure P that is calculated and that is used during the processing of the method. Capillary pressures are typically functions of phase saturations.

The molar balance equations may also include source terms to model injector and producer wells.

The molar balance equations may include additional terms to represent physical diffusion or dispersion of components.

Additionally, an energy balance can be added to the above reservoir equations to solve for the temperature distribution, in case we wish to perform a thermal run.

Figure 4:
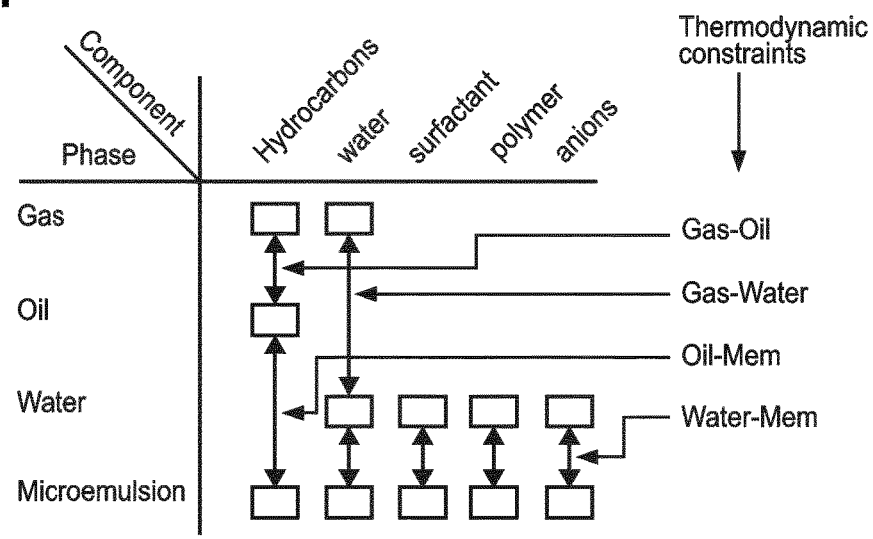
FIG. 4 is an illustration of the binary thermodynamic constraints according to the invention, for non complex runs, said constraints being implemented in step 205 of FIG. 1.
Figure 5:
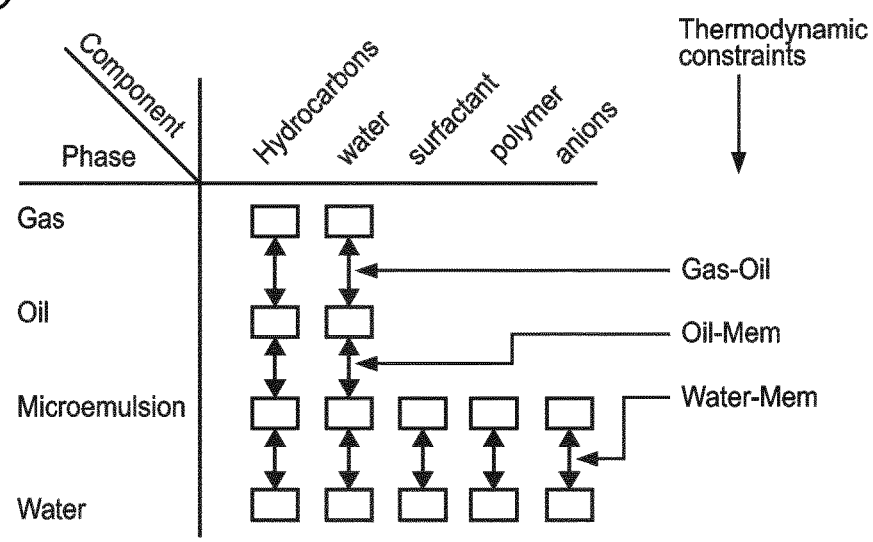
FIG. 5 is an illustration of the binary thermodynamic constraints according to the invention, for complex runs, said constraints being implemented in step 205 of FIG. 1.

The reservoir equations also comprise thermodynamic equations (constraints) corresponding to the equilibrium of each component of the fluid across all phases where said component exists. The structure of said constraints depends on whether we allow hydrocarbons to exist in the water phase or water component to exist in the oil phase, or not. If not, this corresponds to a first case yielding what we call a non-complex run (FIG. 4). If yes, this corresponds to a second case yielding what we call a complex run (FIG. 5).

Both cases are discussed below, and a table representing the component-phase repartition can be found on FIGS. 4 and 5. Each square in the tables means that the corresponding component (or component type) is allowed to exist in the corresponding phase. The links between the squares (the links having an arrow on each end) indicate the thermodynamic constraints governing the equilibrium of the corresponding component across the two considered phases.

3.1 Non-Complex Run

In the first case (non-complex run), the component-phase repartition of which being illustrated on FIG. 4, the water phase does not bear hydrocarbon components and the oil phase does not bear the water component.

If the oil phase and the microemulsion phase are present in such non-complex run, the oil-microemulsion thermodynamic constraints equations are:

$$\forall i \in [1:n_h] : m_i - \Gamma_{am} x_i + \kappa_o = 0$$

where
- $n_h$ is the number of hydrocarbon components in the fluid,
- $m_i$ is the molar fraction of component i in the microemulsion phase,
- $x_i$ is the molar fraction of component i in the oil phase,
- $\kappa_o$ is a volumetric microemulsion constraint,
- $\Gamma_{am}$ is the molar fraction of oleic pseudo-phase in the microemulsion phase, that writes:

$$\Gamma_{om} = \sum_{i=1}^{n_h} m_i.$$

The coefficient $\kappa_o$ can be determined by $\kappa_o = \check{m}_c^2 - A\check{m}_o \check{m}_a$ if the water phase is absent, or by $\kappa_o = \check{m}_c^2 - A\check{m}_o \check{m}_a$ or $\kappa_o = \alpha - \alpha^{inv}$ if the water phase is present.

If the water phase and the microemulsion phase are present in such non-complex run, the water-microemulsion thermodynamic constraints equations are:

$$\left.\begin{array}{c}\forall i \in [n_h + 1 : n_c] \\ i \neq s\end{array}\right\} m_i - \Gamma_{am} w_i + K_a = 0$$

and $$CMC m_w - \Gamma_{am} w_s + \kappa_a = 0$$

where
- s is the index of the surfactant component,
- $\kappa_a$ is a volumetric microemulsion constraint,
- $m_i$ is the molar fraction of component i in the microemulsion phase,
- $w_i$ is the molar fraction of component i in the water phase,
- $m_w$ is the molar fraction of water component in the microemulsion phase,
- $\Gamma_{am}$ is the molar fraction of aqueous pseudo-phase in the microemulsion phase that writes:

$$\Gamma_{am} = CMC m_w + \sum_{i=n_h+1, i \neq s}^{n_c} m_i$$

According to the above equations, only a surfactant concentration equal to the CMC is allowed in the water phase, i.e. $C_M - CMC = 0$, where $C_M$ is the micelle concentration in the water phase.

The coefficient $\kappa_a$ can be determined by $\kappa_a=\check{m}_c^2-A\check{m}_o\check{m}_a$ if the oil phase is absent, or by $\kappa_a=\check{m}_c^2-A\check{m}_o\check{m}_a$ or $\kappa_a=\alpha-\alpha^{inv}$ if the oil phase is present. In that case, we must ensure that $\kappa_a \neq \kappa_o$.

3.2 Complex Run

In the second case (complex run), if we consider for example that all the phases are present, the component-phase repartition is illustrated on FIG. 5. We perform a two-phase (oil-water) flash on the microemulsion molar composition and lump the results into pseudo-phases, such that:

$$\underline{m}=\Gamma_{om}\underline{o}+\Gamma_{am}\underline{a}+\Gamma_{cm}\underline{c}$$

where $\underline{m}$ is the microemulsion molar composition, $\Gamma_{om}$, $\Gamma_{am}$, $\Gamma_{cm}$ are the molar fractions of each pseudo-phase (oleic, aqueous, chemical) in the microemulsion phase, $\underline{o}$, $\underline{a}$, $\underline{c}$ are the molar compositions of each pseudo-phase constitutive of the microemulsion phase.

The underlined of a quantity indicates that said quantity is a vector. For example:

$$\underline{O}=(o_i) \text{ with } i\in[1:n_c].$$

If the oil phase and the microemulsion phase are present in such complex run, the oil-microemulsion thermodynamic constraints equations are:

$$\forall i\in[1:n_c]: \Gamma_{om}(o_i-x_i)+\kappa_o=0$$

where $n_c$ is the number of components in the fluid, $o_i$ is the molar fraction of component i in the oleic pseudo-phase constitutive of the microemulsion phase, $x_i$ is the molar fraction of component i in the oil phase, $\kappa_o$ is a volumetric microemulsion constraint, and $\Gamma_{om}$ is the molar fraction of oleic pseudo-phase in the microemulsion phase.

If the water phase and the microemulsion phase are present in such complex run, the water-microemulsion thermodynamic constraints equations are:

$$\forall i\in[1:n_c]: \Gamma_{am}(a_i-w_i)+\kappa_a=0$$

where $n_c$ is the number of components in the fluid, $a_i$ is the molar fraction of component i in the aqueous pseudo-phase constitutive of the microemulsion phase, $w_i$ is the molar fraction of component i in the water phase, $\kappa_a$ is a volumetric microemulsion constraint, and $\Gamma_{am}$ is the molar fraction of aqueous pseudo-phase in the microemulsion phase.

The non-complex run thermodynamic constraints equations can be recovered from the above complex-run thermodynamic constraints equations, in the limit wherein hydrocarbon components are not allowed in the water phase, and the water component is not allowed in the oil phase.

3.3 Model Properties

The reservoir equations 205 also need the physical properties of the rocks and the physical properties of the fluids that are present inside the petroleum reservoir.

The rock porosity can be derived via the following expression that is linearly dependent on pressure:

$$\phi=\phi^{ref}[1+\chi_\phi\cdot(P-P_\phi^{ref})]$$

where $\phi^{ref}$ is the a reference rock porosity $\chi_\phi$ is the rock compressibility $P_\phi^{ref}$ is a reference pressure.

The density of a brine composed exclusively of water and anions can be assumed to be of the form:

$$\bar{\rho}_w^0=\bar{\rho}_w^{ref}\exp[\chi_w\cdot(P-P_w^{ref})]$$

where $\bar{\rho}_w^{ref}$ is the a reference water density, function of salinity $C_S$, $\chi_w$ is the rock compressibility, $\rho_w^{ref}$ is a reference pressure.

The effect of polymer or surfactant components on the water phase density can be accounted for as well.

The water phase, gas phase and oil phase densities may be calculated via known models, like Equation of State models or correlations. Also, gas, oil and water phase viscosities can be obtained from tables or correlations.

The microemulsion phase density is a linear combination of the densities of its constitutive pseudo-phases, while the microemulsion phase viscosity is a nonlinear combination of the viscosities of its constitutive pseudo-phases.

Relative permeabilities $k_{rj}$ appearing in Darcy's Law may be computed by any four-phase model of the user's choice. However, it is preferred to use a continuous model that is consistent with the relevant two-phase or three-phase sub-models deemed relevant in the absence of gas phase and in the absence of microemulsion phase.

Due to the lack of extensive experimental data to validate a quadriphasic relative permeability model, it is then preferred to use a continuous model in the sense that for given triphasic Oil-Water-Microemulsion and Gas-Oil-Water relative permeability models, the quadriphasic Gas-Oil-Water-Microemulsion relative permeability model must ensure that:

in the limit $S_g \to 0$, where $S_g$ is the gas phase saturation, the relative permeability values predicted by the Oil-Water-Microemulsion triphasic model are recovered, and in the limit $S_m \to 0$, where $S_m$ is the microemulsion phase saturation, the relative permeability values predicted by the Gas-Oil-Water triphasic model are recovered.

Thanks to all the above explanations, a method for simulating surfactant flooding in a petroleum reservoir taking into account four phases (water, oil, gas and microemulsion phases) in equilibrium, using a fully implicit time-stepping strategy, can be implemented on a computer.

Advantageously, as it is apparent from the previous detailed description, the method of the present invention allows to fully implicitly simulate four-phase (gas, oil, water and microemulsion phase) flows arising in chemical flooding, and includes:

(a) a two-stage flash, (b) two-stage equilibrium constraints, (c) four-phase relative permeability models ensuring continuity across all possible phase transitions.

The two-stage flash (a) for example consists in:

(a1) a first stage where hydrocarbons and aqueous components other than surfactant are first equilibrated using a model of the user's choice, and (a2) a second stage where the resulting oil and water phases are then appropriately lumped into pseudo-phases to be equilibrated using a model of the user's choice.

The two-stage equilibrium constraints (b) allow existing phases to remain in equilibrium at all times during the simulation.

The reservoir variables can be treated all implicitly. If desired, they may be also be treated adaptive-implicitly, that is to say only part of the variables (in practice the pressure, or the pressure and saturations) are treated implicitly, and the rest of the variables are treated explicitly.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for improving a recovery of a hydrocarbon from a petroleum reservoir, wherein the method comprises:
creating a model of said petroleum reservoir in which a reservoir fluid can be split in a plurality of physical phases, said plurality of physical phases comprising a gas phase, an oil phase, a water phase and a microemulsion phase, each physical phase comprising a plurality of components, the plurality of components comprising at least water, a hydrocarbon, and a surfactant,
performing a simulation on the model with a flash step for calculating at least compositions of each physical phase by evaluating a concentration and a quantity of each component in said physical phases,
wherein the flash step comprises:
a first stage comprising at least a first flash to determine compositions of a group of phases, said group of phases being the water phase, the oil phase and the gas phase, and said first flash being performed by omitting the surfactant component in the fluid,
a second stage wherein, in case the water phase and the oil phase are simultaneously present in the group of phases determined at the first stage, said second stage comprises at least a second flash to determine a microemulsion composition of the microemulsion phase,
optimizing a surfactant flooding procedure in the petroleum reservoir using the simulation output obtained after the flash step to optimize the timing for injection and the amount of injected surfactant;
initiating the optimized surfactant flooding procedure; and
recovering the hydrocarbons from the petroleum reservoir utilizing the optimized surfactant flooding procedure.

2. The method according to claim 1, wherein the second stage comprises the following:
lumping the gas phase, the water phase and oil phase into pseudo-phases, the pseudo-phases comprising an oleic pseudo-phase, an aqueous pseudo-phase and a chemical pseudo-phase,
performing the second flash on the bases of the pseudo-phases to determine updated compositions of the water phase, oil phase, and to determine the microemulsion composition of the microemulsion phase.

3. The method according to claim 1, wherein the second flash is performed by omitting the gas phase in the group of phases determined at the first stage, and the second stage comprises the following:
lumping the water phase and oil phase into pseudo-phases, the pseudo-phases comprising an oleic pseudo-phase, an aqueous pseudo-phase and a chemical pseudo-phase,
performing the second flash on the bases of the pseudo-phases to determine updated compositions of the water phase, oil phase, and to determine the microemulsion composition of the microemulsion phase.

4. The method according to claim 3, wherein the second stage further comprises merging the gas phase determined at the first stage with the water phase, oil phase and microemulsion phase determined during the second stage.

5. The method according to claim 2, wherein lumping comprises:
a first lumping operation wherein a first fraction of the surfactant component is lumped into the aqueous pseudo-phase so as for the surfactant concentration in said aqueous pseudo-phase to be below the critical micelle concentration, and
a second lumping operation wherein a second fraction of the surfactant component, said second fraction remaining after the first lumping operation, is lumped into the chemical pseudo-phase.

6. The method according to claim 1, further performing the following steps after the flash step:
building reservoir equations based on the compositions of the physical phases determined by the flash step,
solving the reservoir equations to determine reservoir variables at the end of the time step.

7. The method according to claim 6, wherein solving the reservoir equation is performed with a fully implicit solving method or with an adaptive implicit solving method.

8. The method according to claim 6, further including a storing step for storing the reservoir variables onto a medium.

9. The method according to claim 6, wherein the reservoir equations comprise:
molar balance equations for each component in the fluid, and
thermodynamic constraint equations corresponding to an equilibrium of all the physical phases that are present in the fluid.

10. The method according to claim 9, wherein the molar balance equations write for each component of the fluid:

$$\frac{\partial}{\partial t}\left(\phi \sum_{j=1}^{n_p} S_j \rho_j c_{i,j}\right) + \underline{\nabla} \cdot \left(\sum_{j=1}^{n_p} \underline{u}_j \rho_j c_{i,j}\right) = 0$$

where
i is an index corresponding to a component in the fluid,
j is an index corresponding to a phase,
$c_{i,j}$ is the molar fraction of component i in phase j,
$S_j$ is the saturation of phase j,
$\phi$ is the rock porosity,
$\rho_j$ is the molar density of phase j,
$n_P$ is the maximum number of phases present in the fluid,
$\underline{\nabla}$ is the nabla operator,
$\underline{u}_j$ is the Darcy velocity that writes:

$$u_j = -\underline{\underline{k}}\frac{k_{rj}}{\mu_j}(\nabla P_j - \overline{\rho}_j \underline{g})$$

where

P$_j$ is the pressure of phase j,
$\underline{\underline{k}}$ is the absolute permeability tensor of the petroleum reservoir,
k$_{rj}$ is the relative permeability of the phase j,
µ$_j$ is the viscosity of the phase j
$\underline{g}$ is the gravity acceleration,
$\overline{\rho}_j$ is the mass density of phase j.

11. The method according to claim 9, wherein the thermodynamic constraints equations comprise oil-microemulsion thermodynamic constraints equations that write:

$$\forall i \in [1:n_c]: \Gamma_{om}(o_i - x_i) + \kappa_o = 0$$

where n$_c$ is the number of components in the fluid,
o$_i$ is the molar fraction of component i in the oleic pseudo-phase constitutive of the microemulsion phase,
x$_i$ is the molar fraction of component i in the oil phase,
κ$_o$ is a volumetric microemulsion constraint,
Γ$_{om}$ is the molar fraction of oleic pseudo-phase in the microemulsion phase.

12. The method according to claim 9, wherein the thermodynamic constraint equations comprise water-microemulsion thermodynamic constraints equations that write:

$$\forall i \in [1:n_c]: \Gamma_{am}(a_i - w_i) + \kappa_a = 0$$

where n$_c$ is the number of components in the fluid,
a$_i$ is the molar fraction of component i in the aqueous pseudo-phase constitutive of the microemulsion phase,
w$_i$ is the molar fraction of component i in the water phase,
κ$_a$ is a volumetric microemulsion constraint, and
Γ$_{am}$ is the molar fraction of aqueous pseudo-phase in the microemulsion phase.

13. A computer program comprising program code instructions for processing the method steps according to claim 1, said computer program being run by a computer.

14. A computer readable medium having a computer program recorded on it, said computer program comprising program code instructions for processing the method steps according to claim 1.

* * * * *

UNITED STATES PATENT AND TRADEMARK OFFICE
CERTIFICATE OF CORRECTION

PATENT NO. : 10,119,374 B2
APPLICATION NO. : 14/385055
DATED : November 6, 2018
INVENTOR(S) : Leonardo Patacchini et al.

It is certified that error appears in the above-identified patent and that said Letters Patent is hereby corrected as shown below:

In the Claims

Column 19, Line 8 Claim 10:
Delete "$\underline{k}$" and insert --$\underline{k}$--.

Column 19, Line 12 Claim 10:
Delete "$\underline{g}$" and insert --g--.

Signed and Sealed this
Twenty-sixth Day of February, 2019

Andrei Iancu
*Director of the United States Patent and Trademark Office*